(12) United States Patent
Galins

(10) Patent No.: US 7,039,126 B2
(45) Date of Patent: *May 2, 2006

(54) M-ARY SIGNAL CONSTELLATIONS SUITABLE FOR NON-LINEAR AMPLIFICATION

(75) Inventor: Joseph E. Galins, Manhattan Beach, CA (US)

(73) Assignee: Northrop Grumman Corp., Los Angeles, CA (US)

( * ) Notice: Subject to any disclaimer, the term of this patent is extended or adjusted under 35 U.S.C. 154(b) by 589 days.

This patent is subject to a terminal disclaimer.

(21) Appl. No.: 09/883,651

(22) Filed: Jun. 18, 2001

(65) Prior Publication Data

US 2003/0002593 A1    Jan. 2, 2003

(51) Int. Cl.
*H04L 27/36* (2006.01)

(52) U.S. Cl. .................................. 375/298; 375/297

(58) Field of Classification Search .............. 375/261, 375/264, 285, 296, 297, 298, 279, 308; 370/206, 370/207, 208; 455/114.2, 114.3; 332/103, 332/144, 159–160
See application file for complete search history.

(56) References Cited

U.S. PATENT DOCUMENTS

| 5,048,056 | A  | * | 9/1991  | Goldstein         | 375/261 |
| 6,097,764 | A  | * | 8/2000  | McCallister et al.| 375/298 |
| 6,314,146 | B1 | * | 11/2001 | Tellado et al.    | 375/346 |
| 6,574,285 | B1 | * | 6/2003  | Galins            | 375/297 |
| 6,674,811 | B1 | * | 1/2004  | Desrosiers et al. | 375/298 |
| 6,744,827 | B1 | * | 6/2004  | Vandenabeele et al.| 375/320 |

OTHER PUBLICATIONS

C. Melvil Thomas, et al. "Digital amplitude-Phase Keying with M-ary Alphabets," IEEE Transactions on Communications, vol. Com-22, No. 2, Feb. 1974.

* cited by examiner

*Primary Examiner*—Khanh C. Tran
(74) *Attorney, Agent, or Firm*—Patti & Brill, LLC

(57) ABSTRACT

A communications system (10) which utilizes an M-ary QAM signal constellation suitable for non-linear applications. The communications system includes a modulator (18) for utilizing the M-ary constellation to implement the modulation. The M-ary constellation is a circular constellation which provides a simplified amplitude predistortion by utilizing the subject M-ary constellations, enabling more efficient communications can then be achieved through a peak-power-limited non-linear channel (16). Such non-linear channels (16) are more power efficient at creating RF energy from DC energy.

20 Claims, 6 Drawing Sheets

M-ARY SIGNAL CONSTELLATIONS SUITABLE FOR NON-LINEAR AMPLIFICATION

FIELD OF THE INVENTION

The present invention relates generally to communications systems utilizing M-ary modulation formats and, more particularly, to an apparatus and method for efficiently communicating through a peak-power-limited, non-linear channel.

BACKGROUND OF THE INVENTION

In high data rate communications systems, such as selected satellite communications systems, data transmission typically employs high power amplifiers such as traveling wave tube amplifiers (TWTAs) or solid state power amplifiers (SSPAs). Such high speed communications systems typically require a relatively high output power so that the signal being transmitted can travel greater distances before being significantly attenuated. However, such power is limited by several considerations, including the limited energy generation and storage in the satellite vehicle. In these types of communications systems, low frequency digital baseband signals comprising the stream of digital data bits are transmitted after being modulated onto a high frequency carrier wave.

Various modulation schemes exist and distinguish between the digital bits. Examples of digital modulation schemes include amplitude-shift keying (ASK), binary phase-shift keying (BPSK), quadrature-phase shift keying (QPSK), and quadrature amplitude modulation (QAM). Further, the digital baseband signal may be multi level (M-ary) signals requiring multi level modulation methods.

Quadrature modulation schemes provide both amplitude and phase modulation of the carrier because both complex and imaginary representations of the signals are used. In quadrature amplitude modulation schemes, such as QAM, each bit is converted through a bit symbol representing a complex value having an in-phase, real component and a quadrature-phase, imaginary component. Each bit is represented on a graph having an imaginary axis and a real axis to form a constellation pattern representing a group of signals positioned within a circle around the origin of the axes. The distance from the origin represents the amount of power being transmitted. For example, four bits transmitted at a particular time may be represented as 16 symbols. Each symbol of the pattern identifies a complex voltage value having an in-phase component and a quadrature-phase component and represents the complex voltage value for a particular symbol, which is the time during which each symbol is transmitted. The symbols of the constellation pattern are geometrically spread so that they are more equally spaced apart to more readily distinguish the symbols and reduce bit errors. The constellation patterns are processed through the transmitter without being distorted so that the bits are readily distinguishable from each other at the receiver end.

High power amplifiers are desirable in high speed communications applications because they provide high gain over wide bandwidths. However, the input signal to a high power amplifier must be controlled because the high power amplifier exhibits non-linear transfer characteristics. At lower input powers, the output-input power relationship of the high power amplifier is approximately linear. At peak power output, the high power amplifier saturates, and further increases the input power beyond the saturation point actually decrease the output power of the amplifier.

Non-linear amplifiers are inherently more power efficient at creating radio frequency (RF) energy from direct current (DC) energy but create distortions in the process. Such distortions significantly complicate utilizing traditional signal constellations, such as M-ary QAM. Non-linear channels cause the constellation to rotate and expand non-uniformly. Various methods are available to compensate for this expansion and rotation, but such methods are complex and may be difficult to implement.

The non-linearity of the high power amplifier affects the position of the true-invention is particular at predistortion symbols in the constellation pattern by moving them away from the origin. It is known to provide amplifier predistortion techniques in the amplifier when the transmitter is being operated in its non-linear range near peak output power.

Thus, it is desirable to provide an efficient communications system utilizing a peak-power-limited, non-linear channel which compensates for distortion.

SUMMARY OF THE INVENTION

A communications system, comprising a modulator for modulating a digital data stream onto a carrier wave to generate a modulated signal, the modulator converting data in the data stream into symbols for transmission by the communications system, the symbol being encoded into one of M possible symbols of an M-ary constellation, wherein each symbol is defined by one of a plurality of phases and one of a plurality of magnitudes and an amplifier for amplifying the modulated signal prior to transmission to generate an amplified signal, the amplifier having a non-linear characteristic that generates a non-linear distortion in the modulated signal, wherein the M-ary constellation is a 24 point constellation having 16 points defined by a first magnitude and 8 points defined by a second magnitude, wherein the second magnitude is less than the first magnitude.

For a more complete understanding of the invention, its objects and advantages, reference should be made to the following specification and to the accompanying drawings.

BRIEF DESCRIPTION OF THE DRAWINGS

The drawings, which form an integral part of the specification, are to be read in conjunction therewith, and like reference numerals are employed to designate identical components in the various views.

DESCRIPTION OF THE PREFERRED EMBODIMENT

Figure 1:
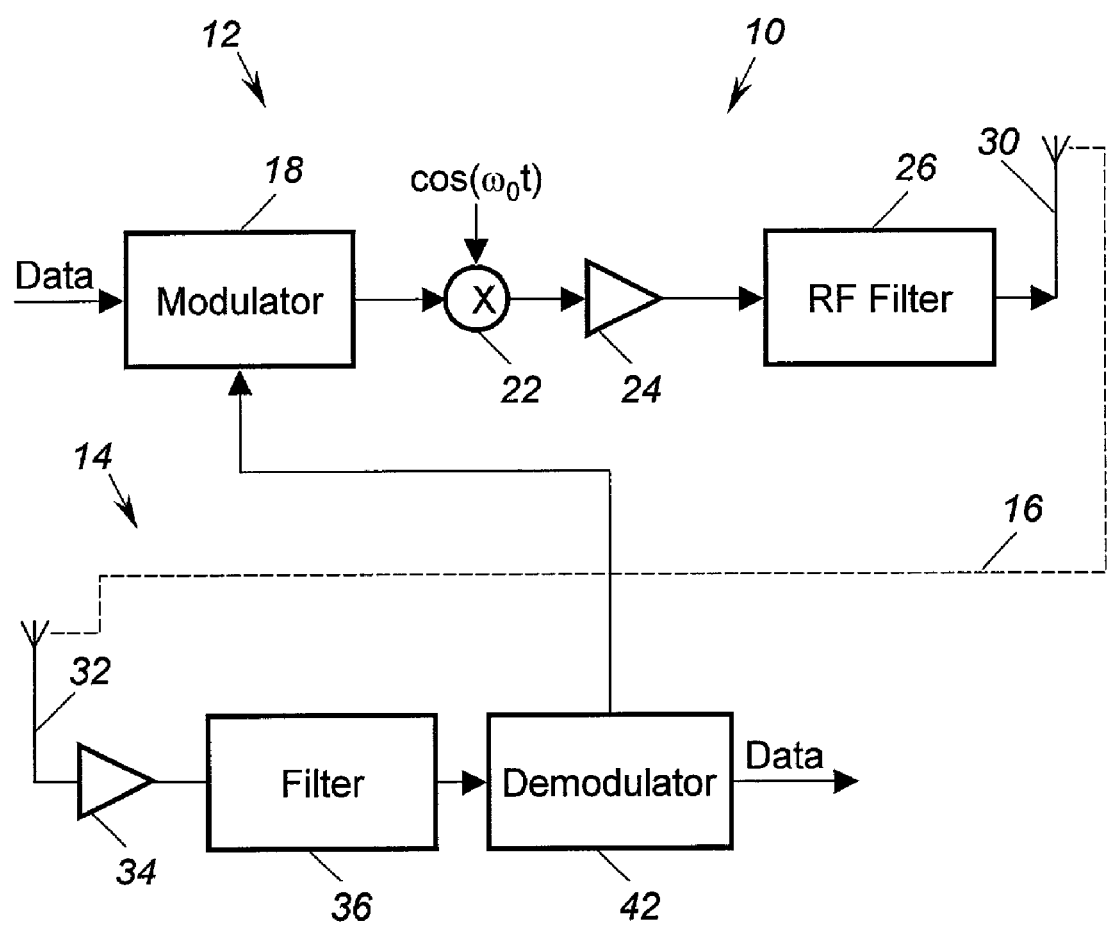
FIG. 1 is a schematic block diagram of a communications system arranged in accordance with the principles of the present invention.

FIG. 1 depicts a block diagram of communications system 10 for exchanging modulated data between a transmitter 12 and a receiver 14 via a communications link 16. Communications link 16 may be an air link for satellite communications or hard-wired interconnection, such as an electrical connection or fiber optic connection. Transmitter 12 includes a modulator 18. Modulator 18 receives a data stream at a baseband frequency and modulates the data stream utilizing a quadrature amplitude modulation (QAM) format. In particular, modulator 18 modulates the data utilizing a M-ary QAM modulation format.

Typically modulator 18 modulates data bits of the data stream onto an analog carrier wave using mixer 22. During modulation, modulator 18 identifies for each bit pattern a symbol that includes a in-phase and quadrature-phase component, and maps the symbols into a M-ary constellation pattern, as will be described in greater detail herein. Modulator 18 may be any quadrature amplitude modulator suitable for implementing the M-ary constellations as described herein.

Modulator 18 outputs a radio frequency (RF) signal at a baseband frequency. Typically for satellite communications, the RF signal is up-converted to a high frequency for transmission. A mixer 22 up-converts the baseband frequency with a high frequency signal, such as $\cos(\omega_0 t)$. Mixer 22 up-converts the in-phase and quadrature-phase representation of the complex voltage from modulator 18 to a single high frequency RF signal. The up-converted RF signal is then applied to amplifier 24 to significantly increase the signal gain for transmission. Operation of the mixing step and amplification step for a transmitter of this type is well understood by those skilled in the art. The up-converted, amplified signal from amplifier 24 is applied to RF filter 26 for subsequent RF filtering, such as may be required by Federal Communications Commission (FCC) requirements. The filtered signal is output to an antenna 30 for transmission to receiver 14.

In the configuration of FIG. 1, amplifier 24 introduces a distortion into the signal output by modulator 18. The output for amplifier 24, which is applied to RF filter 26 has an inherent distortion. As will be described in greater detail herein with respect to FIGS. 3 and 4, modulator 18 operates so as to introduce a predistortion into the signal output by modulator 18 and applied to mixer 22. Amplifier 24 thus adjusts the predistorted signal to output a distortion compensated signal input to RF filter 26.

Antenna 30 receives the filtered signal and outputs over communications link 16 a communications signal which is received by antenna 32 of transmitter 12. Antenna 32 is connected to an amplifier 34, which is preferably a low-noise, linear amplifier. Note that although communication system 10 is shown as having a wireless communications link 16, communications link 16 may be a hard-wired connection, as described above. In such a situation, antennas 30 and 32 are unnecessary.

The signal received by antenna 32 at receiver 14 is input to a filter 36. Filter 36 provides initial filtering of the received signal to filter channel noise and the like. Typically, filter 36 is closely matched to the transmitted signal frequency. The output of filter 36 is applied to a mixer 38 to down-convert the RF signal to an intermediate frequency signal by mixing the RF signal with a high frequency $\cos(\omega_0 t)$ signal. The down-converted signal from mixer 38 includes baseband in-phase and quadrature-phase components. The down-converted signal is applied to low-pass filter 40 to provide filtering at baseband frequencies. Thus, in receiver 14, filter 36 acts as a course filter.

The filtered baseband signal from low-pass filter 40 is applied to a demodulator 42. Demodulator 42 demodulates the received signal in accordance with the M-ary QAM format implemented in modulator 18. Demodulator 42 thus outputs the data initially modulated by modulator 18.

Figure 2:
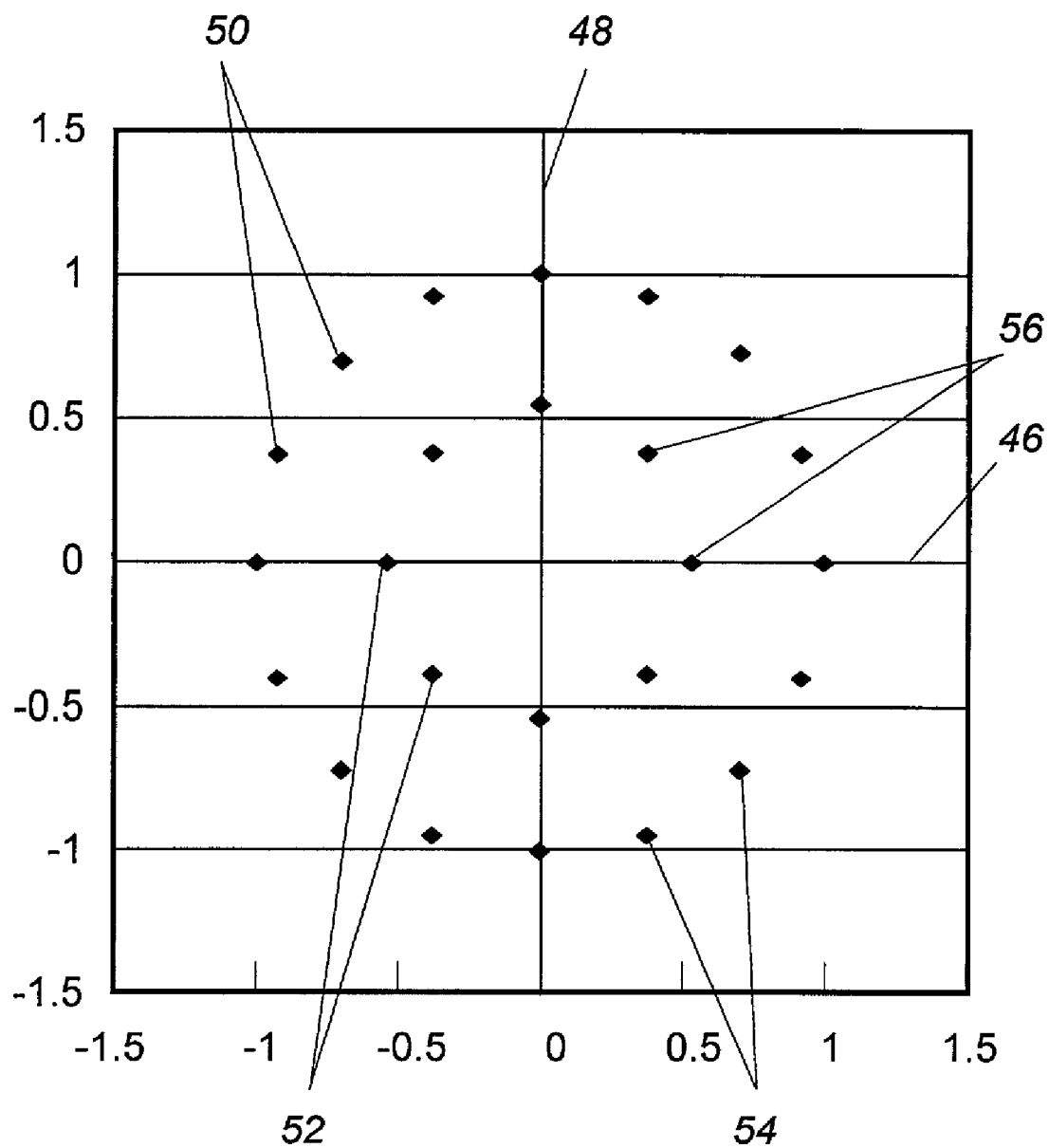
FIG. 2 is a constellation diagram for a 24-ary modulation communications system.

In a particular feature of the subject invention, FIG. 2 depicts a 24-ary QAM constellation arranged on a Cartesian coordinate system defined by an in-phase axis 46 and quadrature-phase axis 48. The 24-ary constellation of FIG. 2 includes an upper amplitude level 50 and a lower amplitude level 52. Upper amplitude level 50 and lower amplitude level 52 represent differing power levels for driving amplifier 24 of FIG. 1. Upper amplitude level 50 represents the peak power of amplifier 24, and lower amplitude level 52 represents a power level less than the peak power of amplifier 24. A plurality of upper amplitude symbols 54 are arranged on upper amplitude level 50. Similarly, a plurality of lower amplitude symbols 56 are arranged on lower amplitude level 52.

In the 24-ary constellation of FIG. 2, 16 upper amplitude symbols 54 are arranged along upper amplitude level 50, and 8 lower amplitude symbols 56 are arranged along lower amplitude level 52. Amplitude levels 50, 52 of the 24-ary constellation of FIG. 2 define two concentric circles with the upper amplitude level 50 having an amplitude greater than lower amplitude level 52. Upper amplitude level 52 has a unit radius of 1, and inner amplitude level 52 has a radius of 0.54. Upper amplitude symbols 54 are separated along the upper amplitude level 50 by 22.5° with one upper amplitude symbols 54 located at cartesion coordinates x=1 and y=0, (1,0). Similarly, lower amplitude symbols 56 are arranged along lower amplitude level 52 and are separated by 45°, with one lower amplitude symbol 56 located at Cartesian coordinate x=0.54 and y=0, (0.54, 0). The 24-ary constellation enables modulation of an average 4.58 bit word or symbol. To implement a practical 24-ary system requires mapping of a large number of binary bits(M) to a number (M/4.58) of 24-ary symbols.

The arrangement of symbols of upper amplitude level 50 and lower amplitude 56 is particularly selected to maximize the number of points in which amplifier 24 can operate at saturation. In particular, by placing the maximum number of points on upper amplitude level 50, amplifier 24 operates in saturation mode for transmission of the maximum number of symbols. The symbols placed on lower amplitude level 52 represent operation of amplifier 24 in a backed-off mode. However, due to signal-to-noise-ratio (SNR) considerations, not all points can be placed on upper amplitude level 52. Arranging and placing symbols on each of upper amplitude level 50 and lower amplitude level 52 preferrably maximizes the number of symbols for which amplifier 24 operates in saturation mode while pursuing good performance in the presence of noise.

Figure 3:
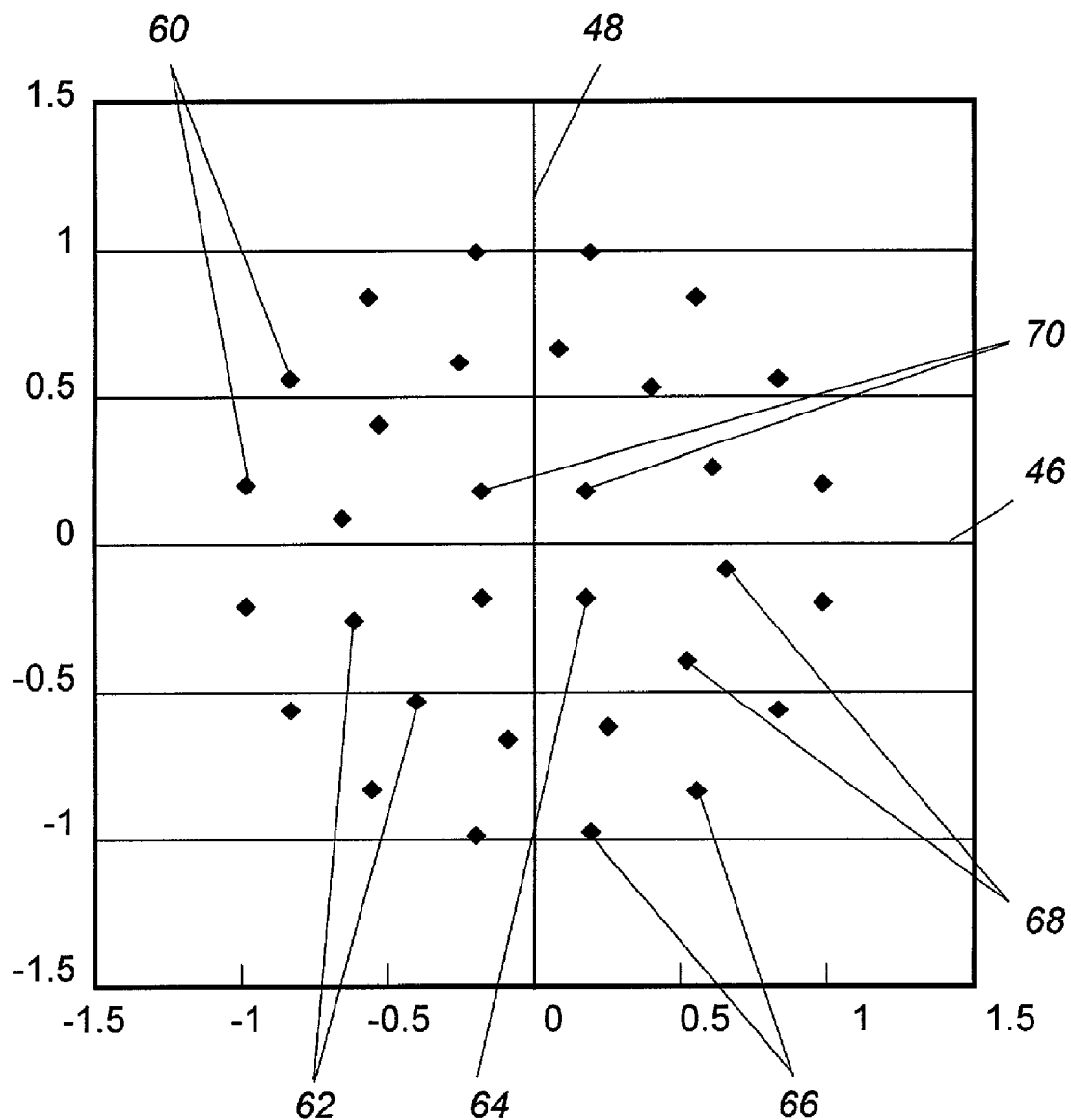
FIG. 3 is a constellation diagram for a 32-ary modulation communications system.

FIG. 3 depicts a constellation similar to FIG. 2, but shows a 32-ary constellation for use by modulator 18 of FIG. 1. The 32-ary constellation of FIG. 3 enables modulation of up to a 5 bit word or symbol. The 32-ary constellation of FIG. 3 includes three amplitude levels: a first amplitude level 60, a second amplitude level 62, and a third amplitude level 64. First amplitude level 60 has an amplitude greater than second amplitude level 62, and second amplitude level 62 has a greater amplitude than third amplitude level 64. Each amplitude level 60, 62, 64 defines three concentric circles. First amplitude level 60 includes first amplitude symbols 66, second amplitude level 62 includes second amplitude symbols 68, and third amplitude level 64 includes third amplitude symbols 70. First amplitude level 60 has a unit radius of 1, second amplitude level 62 has a radius of 0.662, and third amplitude level 64 has a radius of 0.25. First amplitude level 60 includes 16 first amplitude level symbols 66, second amplitude level 62 includes 12 second amplitude symbols 68, and third amplitude level 64 includes four third amplitude symbols 70.

The following chart lists the position of each of the 32 points in polar coordinates and in cartesian coordinates.

| Symbol | Radius | Angle | X | Y |
|---|---|---|---|---|
| 1 | 1 | 11.25 | 0.980785 | 0.195 |
| 2 | 1 | 33.75 | 0.83147 | 0.556 |
| 3 | 1 | 56.25 | 0.55557 | 0.831 |
| 4 | 1 | 78.75 | 0.19509 | 0.981 |
| 5 | 1 | 101.3 | −0.19509 | 0.981 |
| 6 | 1 | 123.8 | −0.55557 | 0.831 |
| 7 | 1 | 146.3 | −0.83147 | 0.556 |
| 8 | 1 | 168.8 | −0.98079 | 0.195 |
| 9 | 1 | 191.3 | −0.98079 | −0.195 |
| 10 | 1 | 213.8 | −0.83147 | −0.556 |
| 11 | 1 | 236.3 | −0.55557 | −0.831 |
| 12 | 1 | 258.8 | −0.19509 | −0.981 |
| 13 | 1 | 281.3 | 0.19509 | −0.981 |
| 14 | 1 | 303.8 | 0.55557 | −0.831 |
| 15 | 1 | 326.3 | 0.83147 | −0.556 |
| 16 | 1 | 348.8 | 0.980785 | −0.195 |
| 17 | 0.662 | 22.5 | 0.611608 | 0.253 |
| 18 | 0.662 | 52.5 | 0.403 | 0.525 |
| 19 | 0.662 | 82.5 | 0.086408 | 0.656 |
| 20 | 0.662 | 112.5 | −0.25334 | 0.612 |
| 21 | 0.662 | 142.5 | −0.5252 | 0.403 |
| 22 | 0.662 | 172.5 | −0.65634 | 0.086 |
| 23 | 0.662 | 202.5 | −0.61161 | −0.253 |
| 24 | 0.662 | 232.5 | −0.403 | −0.525 |
| 25 | 0.662 | 262.5 | −0.08641 | −0.656 |
| 26 | 0.662 | 292.5 | 0.253336 | −0.612 |
| 27 | 0.662 | 322.5 | 0.5252 | −0.403 |
| 28 | 0.662 | 352.5 | 0.656336 | −0.086 |
| 29 | 0.25 | 45 | 0.176777 | 0.177 |
| 30 | 0.25 | 135 | −0.17678 | 0.177 |
| 31 | 0.25 | 225 | −0.17678 | −0.177 |
| 32 | 0.25 | 315 | 0.176777 | −0.177 |

Symbols 1–16 define first amplitude symbols 66, symbols 17–28 define second amplitude symbols 68, and symbols 29–32 define third amplitude symbols 70. As can be seen in the chart, each first amplitude symbol 66 is separated by 22.5°, each second amplitude symbol 68 is separated by 30°, and each third amplitude symbol 70 is separated by 90°.

Similarly to FIG. 2, amplitude levels 60, 62, and 64 are selected to maximize the number of symbols for which amplifier 24 operates in saturation. Further, second amplitude level 62 and third amplitude level 64 are selected so that amplifier 24 operates as efficiently as possible when amplifying the symbols placed on second amplitude level 62 and third amplitude level 64. Further yet, the symbols are selected in order to provide suitable signal-to-noise ration for the symbols placed on each restective amplitude level.

Figure 4:
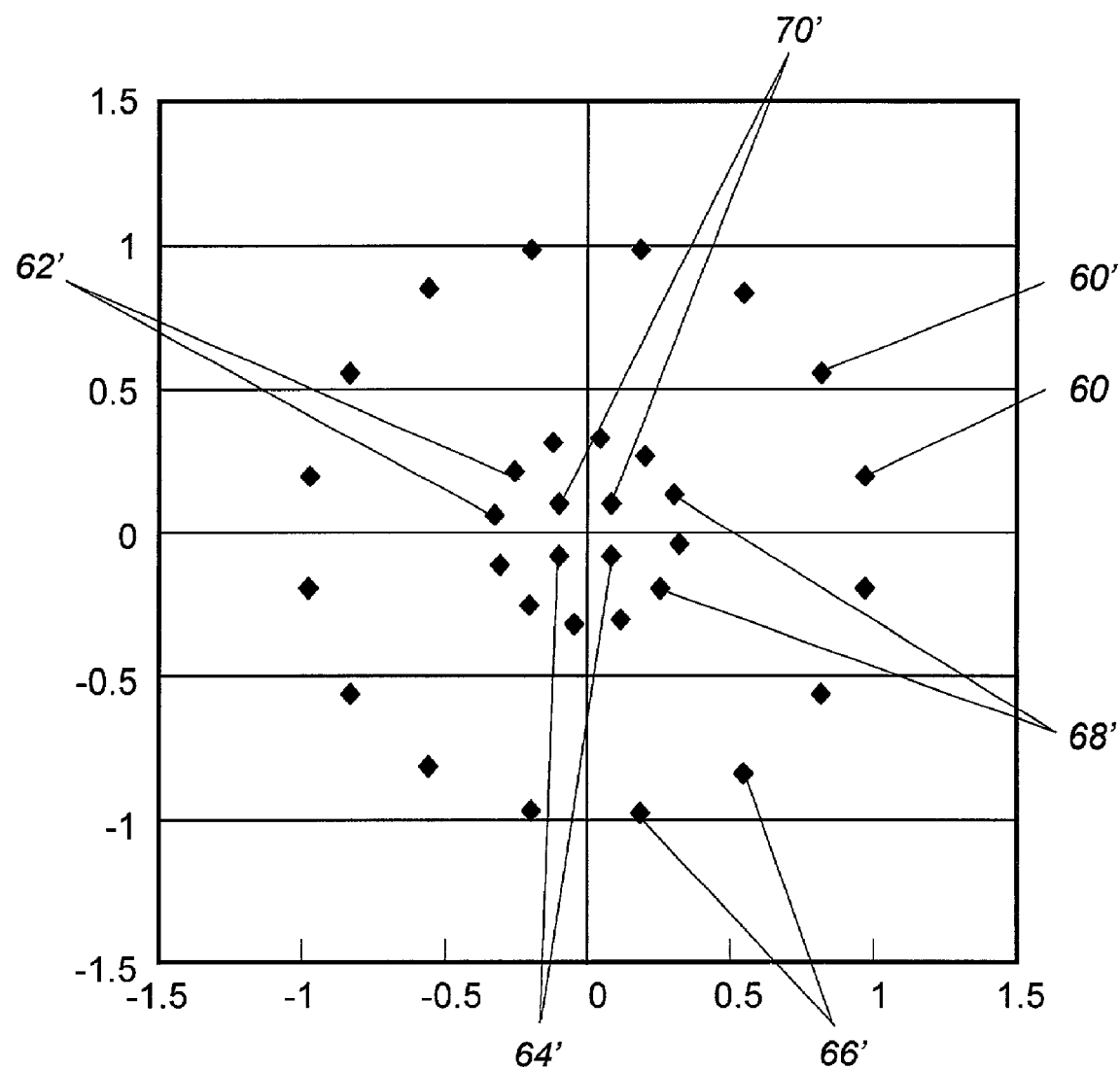
FIG. 4 is a constellation diagram demonstrating a sample predistortion for the constellation diagram of FIG. 3.

As discussed above, modulator 18 introduces a predistortion into the signal output by modulator 18 and applied to mixer 22. Amplifier 24 thus distorts the predistorted signal to output a desired signal for input to RF filter 26. FIG. 4 depicts a constellation diagram similar to the constellation diagram of FIG. 3. The symbols, however, FIG. 4 are arranged to show a sample, predistorted constellation output by modulator 18. It should be noted that similar symbols from FIG. 3 have been referenced using the same reference number but including a prime (') to designate the predistorted symbol. The constellation diagram of FIG. 4 represents the output from modulator 18. The constellation diagram of FIG. 3 represents a preferred arrangement for the 32-ary constellation diagram. Amplifier 24 receives symbols arranged in accordance with FIG. 4 and outputs symbols arranged in accordance with FIG. 3.

Figure 5:
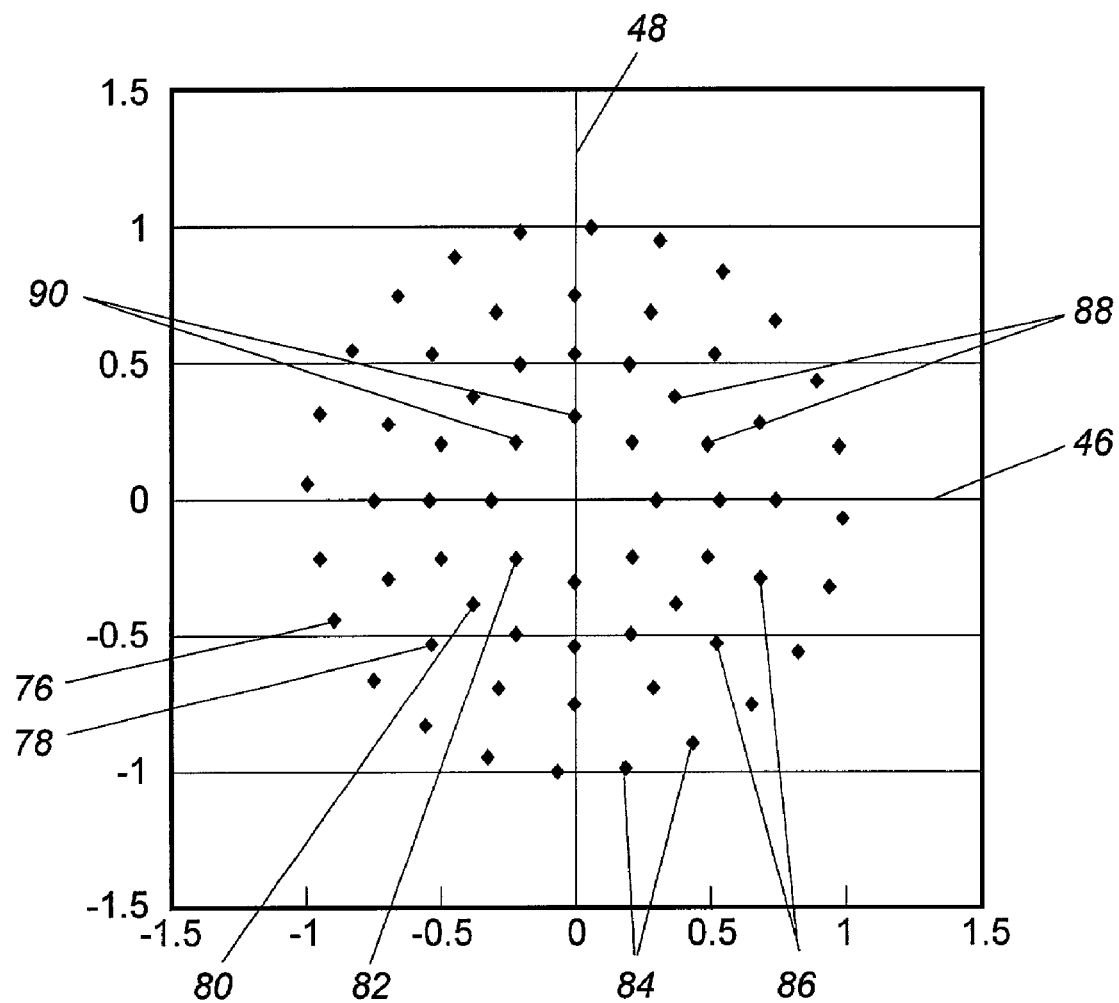
FIG. 5 is a constellation diagram for a 64-ary, four level modulation communications system.

FIG. 5 depicts a 64-ary constellation utilized for QAM by modulator 18. The 64-ary constellation is depicted as a four level constellation on a Cartesian coordinate system having an in-phase axis 46 and a quadrature-phase axis 48. The 64-ary constellation includes a first amplitude level 76, a second amplitude level 78, a third amplitude level 80, and fourth amplitude level 82. As previously described, each respective amplitude level has a plurality of first amplitude symbols 84, second amplitude symbols 86, third amplitude symbols 88, and fourth amplitude symbols 90.

First amplitude level 76 has a radius of 1, second amplitude level 78 has a radius of 0.75, third amplitude level 80 has a radius of 0.54, and fourth amplitude level has a radius of 0.308. First amplitude level 76 includes 24 first amplitude symbols 84, second amplitude level 78 includes 16 second amplitude symbols 86, third amplitude level 80 includes 16 third amplitude symbols, and fourth amplitude level includes eight fourth amplitude symbols 90. First amplitude symbols 84 are separated by 15°, with one first amplitude symbols 84 falling at Cartesian coordinates x=0.980785 and y=0.195 (0.980785, 0.195). Second amplitude symbols 86 are separated by 22.5°, with one second amplitude symbols 86 being located at x=0 and y=0.75, (0, 0.75). Third amplitude symbols 88 are arranged similarly to second amplitude symbols 86, within one third amplitude symbol 88 located at x=0.54 and y=0, (0.54, 0). Fourth amplitude symbols 90 are separated by 45°, with a fourth amplitude symbol being located at x=0.308 and y=0, (0.308, 0).

Alternative four ring implementations to those described with respect to FIG. 3 may be utilized. For example, a 62-ary constellation may have four rings having 32, 16, 12, and 4 respective symbols. Each ring may have respective amplitude levels of 1.0, 0.75, 0.54, and 0.33. An alternate four-ring implementation may include four rings having 32, 16, 8, and 8 respective symbols. The amplitude level of each respective ring may be 1.0, 0.8, 0.6, and 0.4.

Figure 6:
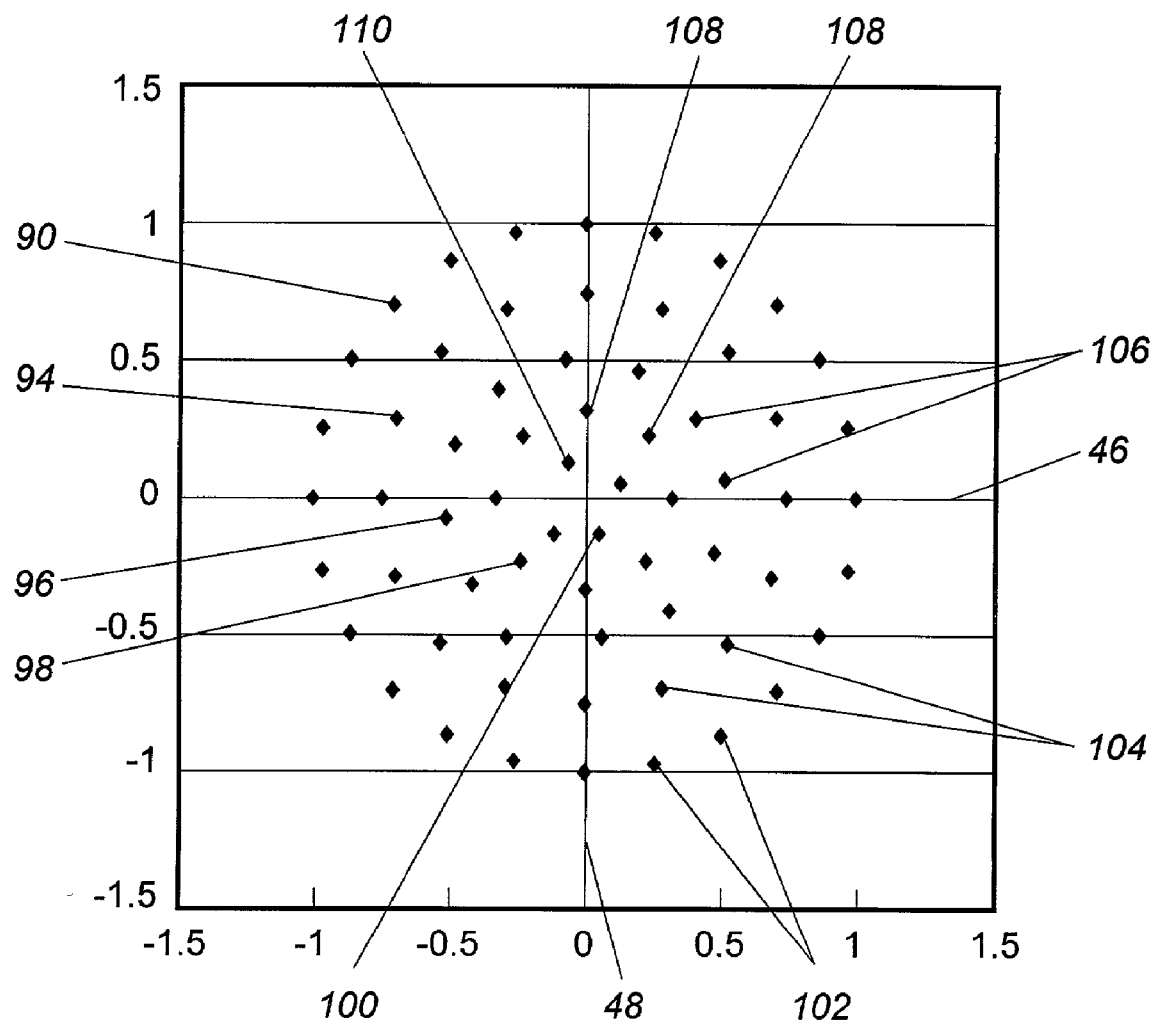
FIG. 6 is a constellation diagram for a 64-ary, five level modulation communications system.

FIG. 6 depicts a second implementation of a 64-ary constellation. The 64-ary constellation of FIG. 6 is implemented as a 5-level constellation. The constellation enables encoding of up to a 6 bit word. The 64-ary constellation of FIG. 6 includes a first amplitude level 92, a second amplitude level 94, a third amplitude level 96, a fourth amplitude level 98, and fifth amplitude level 100. The respective amplitude levels include respective first amplitude symbols 102, second amplitude symbols 104, third amplitude symbols 106, fourth amplitude symbols 108, and fifth amplitude symbols 110. First amplitude level 92 has a unit radius of 1; second amplitude level 94 has a radius of 0.75; third amplitude level 96 has a radius of 0.516; fourth amplitude level 98 has a radius of 0.323; and fifth amplitude level 100 has a radius of 0.141. First amplitude level 92 has 24 first amplitude symbols 102; second amplitude level 94 has 16 second amplitude symbols 104; third amplitude level 96 has 12 third amplitude symbols 106; fourth amplitude level 98 has eight fourth amplitude symbols 108; and fifth amplitude symbols 100 has four fifth amplitude symbols 110.

First amplitude symbols 102 are separated by 15°, with one first symbol 102 located at coordinates x=1, y=0, (1, 0). Second amplitude symbols 104 are separated by 22.5°, with a second amplitude symbol 104 located at coordinates x=0.738965, y=0 (0.738965, 0). Third amplitude symbols 106 are separated by 30°, with one third amplitude symbol 106 being located at coordinates x=0.511516 and y=0.067342301 (0.5115616, 0.067342301). Fourth amplitude symbols 108 are separated by 45°, with one fourth amplitude symbol 108 located at coordinate x=0.323195, y=0, (0.323195, 0). Fifth amplitude symbols 110 are separated by 90°, with one fifth amplitude symbol 110 located at Cartesian coordinates x=0.130657 and y=0.54120018, (0.130657, 0.54120018).

Similarly, as described above, for each 64-ary constellation of FIGS. 5 and 6, the number of symbol and position of each symbol placed on the respective amplitude levels is selected so that amplifier 24 operates at peak efficiency for the greatest number of symbols. Thus, the particular number of amplitude levels and the particular number of symbols placed on each amplitude level and the relative position of each symbol is specifically selected to maximize operation of amplifier 24.

The above-described invention utilizes concentric constellations to provide simple compensation amplitude distortion. By utilizing concentric constellations, the expansion of inner constellations is controlled by one setting for a 24-ary constellation, two settings for a 32-ary constellation, and three or four settings, depending upon the number of amplitude levels, for a 64-ary constellation. The spacing between symbols in each M-ary constellation is selected to arrive at a suitable tradeoff between resolution and power and enables available power.

Further, fewer amplitude levels may be used when employing the teachings described herein. For example, only three amplitude levels are used rather than five amplitude levels for traditional 32-QAM implementations. Further, when compared to conventional square constellations, the circular constellations defined herein utilize peak-power more efficiently.

While the invention has been described in its presently preferred form, it is to be understood that there are numerous applications and implementations for the present invention. Accordingly, the invention is capable of modification and changes without departing from the spirit of the invention as set forth in the appended claims.

What is claimed is:

1. A communications system, comprising:
a modulator for modulating a digital data stream onto a carrier wave to generate a modulated signal, the modulator converting data in the data stream into symbols for transmission by the communications system, the symbols being encoded into one of M possible symbols of a M-ary constellation, wherein each symbol is defined by one of a plurality of phases and one of a plurality of magnitudes; and
an amplifier for amplifying the modulated signal prior to transmission to generate an amplified signal, the amplifier having a non-linear characteristic that generates a non-linear distortion in the modulated signal, wherein the M-ary constellation is a 24 point constellation having 16 points defined by a first magnitude and 8 points defined by a second magnitude, wherein the second magnitude is less than the first magnitude.

2. The communications system of claim 1 wherein the amplifier has a gain which differs for each amplitude.

3. The communications system of claim 1 wherein the amplifier has a predetermined, non-linear characteristic and the constellation varies in accordance with the non-linear characteristic.

4. A communications system, comprising:
a modulator for modulating a digital data stream onto a carrier wave to generate a modulated signal, the modulator converting data in the data stream into symbols for transmission by the communications system, the symbols being encoded into one of M possible symbols of an M-ary constellation, wherein each symbol is defined by one of a plurality of phases and one of a plurality of magnitudes; and
an amplifier for amplifying the modulated signal prior to transmission to generate an amplified signal, the amplifier having a non-linear characteristic that generates a non-linear distortion in the modulated signal, wherein the M-ary constellation is a 32 point constellation having 16 points defined by a first magnitude, 12 points defined by a second magnitude, and 4 points defined by a third magnitude, wherein the second magnitude is less than the first magnitude and the third magnitude is less than the second magnitude.

5. The communications system of claim 4 wherein the amplifier has a gain which differs for each amplitude.

6. The communications system of claim 4 wherein the amplifier has a predetermined, non-linear characteristic and the constellation varies in accordance with the non-linear characteristic.

7. A communications system, comprising:
a modulator for modulating a digital data stream onto a carrier wave to generate a modulated signal, the modulator converting data in the data stream into symbols for transmission by the communications system, the symbols being encoded into one of M possible symbols of an M-ary constellation, wherein each symbol is defined by one of a plurality of phases and one of a plurality of magnitudes; and
an amplifier for amplifying the modulated signal prior to transmission to generate an amplified signal, the amplifier having a non-linear characteristic that generates a non-linear distortion in the modulated signal, wherein the M-ary constellation is a 64 point constellation having 24 points defined by a first magnitude, 16 points defined by a second magnitude, 16 points defined by a third magnitude, and 8 points defined by a fourth magnitude, wherein the second magnitude is less than the first magnitude, the third magnitude is less than the second magnitude, and the fourth magnitude is less than the third magnitude.

8. The communications system of claim 7 wherein the amplifier has a gain which differs for each amplitude.

9. The communications system of claim 7 wherein the amplifier has a predetermined, non-linear characteristic and the constellation varies in accordance with the non-linear characteristic.

10. A communications system, comprising:
a modulator for modulating a digital data stream onto a carrier wave to generate a modulated signal, the modulator converting data in the data stream into symbols for transmission by the communications system, the symbols being encoded into one of M possible symbols of an M-ary constellation, wherein each symbol is defined by one of a plurality of phases and one of a plurality of magnitudes; and
an amplifier for amplifying the modulated signal prior to transmission to generate an amplified signal, the amplifier having a non-linear characteristic that generates a non-linear distortion in the modulated signal, wherein the M-ary constellation is a 64 point constellation having 24 points defined by a first magnitude, 16 points defined by a second magnitude, 12 points defined by a third magnitude, 8 points defined by a fourth magnitude, and 4 points defined by a fifth magnitude, wherein the second magnitude is less than the first magnitude, the third magnitude is less than the second magnitude, the fourth magnitude is less than the third magnitude, and the fifth magnitude is less than the fourth magnitude.

11. The communications system of claim 10 wherein the amplifier has a gain which differs for each amplitude.

12. The communications system of claim 10 wherein the amplifier has a predetermined, non-linear characteristic and the constellation varies in accordance with the non-linear characteristic.

13. A method of encoding data comprising the steps of:
modulating a digital data stream onto a carrier wave to generate a modulated signal, the step of modulating converting data in the data stream into symbols, the symbols being encoded into one of M possible symbols of an M-ary constellation, wherein each symbol is defined by one of a plurality of phases and one of a plurality of magnitudes; and
amplifying the modulated signal prior to transmission to generate an amplified signal, the step of amplifying introducing a non-linear characteristic that generates a non-linear distortion in the modulated signal, wherein the M-ary constellation is a 24 point constellation having 16 points defined by a first magnitude and 8 points defined by a second magnitude, wherein the second magnitude is less than the first magnitude.

14. The method of claim 13 wherein the step of amplifying further comprises varying each magnitude in accordance with the non-linear characteristic.

15. A method of encoding data comprising the steps of:
modulating a digital data stream onto a carrier wave to generate a modulated signal, the step of modulating converting data in the data stream into symbols, the symbols being encoded into one of M possible symbols of an M-ary constellation, wherein each symbol is defined by one of a plurality of phases and one of a plurality of magnitudes; and
amplifying the modulated signal prior to transmission to generate an amplified signal, the step of amplifying introducing a non-linear characteristic that generates a non-linear distortion in the modulated signals, wherein the M-ary constellation is a 32 point constellation having 16 points defined by a first magnitude, 12 points defined by a second magnitude, and 4 points defined by a third magnitude, wherein the second magnitude is less than, the first magnitude and the third magnitude is less than the second magnitude.

16. The method of claim 15 wherein the step of amplifying further comprises varying each magnitude in accordance with the non-linear characteristic.

17. The method of claim 13 wherein the step of converting data in the data stream into symbols comprises the step of converting data in the data stream into bit symbols.

18. The method of claim 17 wherein the step of amplifying further comprises varying each magnitude in accordance with the non-linear characteristic.

19. A method of encoding data comprising the steps of:
modulating a digital data stream onto a carrier wave to generate a modulated signal, the step of modulating converting data in the data stream into bit symbols, the bit symbols being encoded into one of M possible bit symbols of an M-ary constellation, wherein each bit symbol is defined by one of a plurality of phases and one of a plurality of magnitudes; and
amplifying the modulated signal prior to transmission to generate an amplified signal, the step of amplifying introducing a non-linear characteristic that generates a non-linear distortion in the modulated signal, wherein the M-ary constellation is a 64 point constellation having 24 points defined by a first magnitude, 16 points defined by a second magnitude, 12 points defined by a third magnitude, 8 points defined by a fourth magnitude, and 4 points defined by a fifth magnitude, wherein the second magnitude is less than the first magnitude, the third magnitude is less than the second magnitude, the fourth magnitude is less than the third magnitude, and the fifth magnitude is less than the fourth magnitude.

20. The method of claim 19 wherein the step of amplifying further comprises varying each magnitude in accordance with the non-linear characteristic.

* * * * *